Patented Oct. 6, 1942

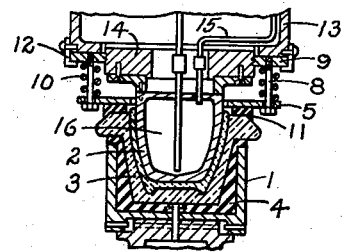

2,298,223

UNITED STATES PATENT OFFICE 2,298,223

METHOD AND APPARATUS FOR MANUFACTURING POTTERY WARE

William J. Miller, Swissvale, Pa.

Application June 8, 1940, Serial No. 339,522

27 Claims. (Cl. 25—24)

This invention relates to method and apparatus for manufacturing pottery ware. It has to do with forming semi-vitreous, vitreous or earthenware products, for instance, plates, cups and saucers and the like in or on plaster molds from plastic ceramic material.

In my co-pending application Serial No. 205,711, I have shown and described certain improvements in methods and apparatus for the manufacture of the ware of this class, notably improved mold supporting and ware fabricating provisions. The present application shows and describes subject matter appearing in said co-pending application and is to be considered as a continuation in part thereof as to all divisible subject matter.

In the present invention, improvements are contemplated for leveling and steadying the mold in the chuck during any one or all of the following operations, viz: the approach of the tool and work, the dwell thereof in working position whilst plastic ceramic material is being fabricated on the mold and separation thereof after the work has been completed. The improvements are illustrated herein, by way of example, in connection with apparatus for making mold bonded jiggering bats or blanks.

In the drawing:

Figure 1 is a sectional elevation of the press portion of a machine for forming and applying jiggering bats to hollow ware molds and including the novel mold stabilizing improvements hereof.

Figure 2 is a perspective view of the stabilizing head removed from the apparatus of Figure 1 and inverted.

Figure 3 is an elevation partly in section of another arrangement for supporting the stabilizing head of Figure 2.

Figure 4 is an elevation partly in section showing another method of supporting the stabilizing head of Figure 2.

Figure 5 is a sectional elevation showing still another method of supporting the stabilizing head and also illustrating a modification in said stabilizing head.

Figure 6 shows a flat ware pottery mold with a charge of clay improperly disposed thereon.

Figure 7 shows a hollow ware mold with a charge of clay improperly disposed therein.

Figure 8 is a sectional elevation of a mold chuck with mold therein showing how the size of the cavity in the chuck may be fitted to the requirement of the mold.

Figures 9 and 10 are detailed views partly in section showing how a tilted mold is straightened up by the improvements hereof.

Figure 11 is an elevation showing how the mold may be steadied by plural stabilizing provisions.

Figure 12 is an enlarged sectional elevation of the stabilizing device of Figure 11 showing details of construction.

Figure 13 is a sectional elevation showing a modified form of construction of the stabilizing device of Figure 12.

Figure 14 is a fragmentary view showing how the stabilizing provisions of Figure 12 may be applied to steadying flat ware molds.

Figure 15 is a sectional elevation of a portion of a flat ware mold and die illustrating a modified form of flat ware steadying apparatus.

Figure 16 is a fragmentary view in sectional elevation of a modified form of flat ware steadying means.

Figure 17 is a side elevation of a mold chuck and elevating mechanism such as may be used in a pottery press.

Figure 1 illustrates a portion of a machine for forming mold bonded jiggering bats in hollow ware molds. It consists in a chuck 1 and a superimposed die 2, said die having a clay engaging surface oppositely contoured to that of the molding surface of the mold 3, said mold being removably disposed in the chuck. A clay charge containing the proper volume of material but incompletely covering the molding surface is placed in the mold either automatically or by hand and thereafter by cooperation of the die and the mold the clay is caused to spread over the uncovered portion of the ware forming surface of the mold. When the operation is completed, the mold is transferred to a profiling station where the material is jiggered and thereafter the mold and ware are placed in a drier. When the ware dries and releases from the mold, it is removed therefrom, fettled, finished, glazed and fired.

The chuck comprises a rigid shell having a cavitous insert 4 of rubber or of like material fitted to the inside wall and upper rim of the shell. Said cavity is slightly larger in size than the mold tang to permit free insertion and removal of the mold. When the mold is under pressure, it tends to bed itself in the base of the insert, the reaction being to cause the vertical wall of the insert cavity to uniformly contract around the mold and hold it in a solid embrace.

5 is a rectangular plate with a large central hole 6, Figure 2, and apertures 7 for suspending it by bolts 8 screwed into ring 9. 10 is a compression spring encompassing each bolt 8. Secured to the underside of the plate is a ring 11 of resilient material concentric with the die 2, said ring being formed with an inwardly tapered outer ledge to fit centrally over the horizontal upper surface of the mold and tapered brim portion. Ring 9 is suspended by angles 12 from a support 13 which may either be a stationary lintel or a portion of a rotatable turret. Die 2 is attached to a collar 14 screwed into ring 9 and may be vertically adjusted by rotating the ring. A steam line 15 may supply steam to chamber 16 in the die in order to heat the ware forming surface and render it non-adhesive.

When the mold engages ring 11, the mold is forced home in its seat centralized with respect to the die, this occurring preferably before the mold and die reach final closing relationship, the ring 11 and plate 5 being normally displaced upwardly against the tension of springs 10. In case the charge of clay is improperly disposed in the bottom of the mold, see Figure 7, the ring 11 will prevent radial displacement of the mold in response to the off center application of force as the die meets the clay. This insures that the mold will not tilt or move side-wise relative to the die and thus disturb the circumferential uniformity of cross sectional area of the molding cavity existing between the face of the die and the molding surface of the mold. Therefore, no undesirable variation in the wall thickness of the ware will occur.

Moreover, should spald lodge in the base of the chuck, see Figure 9, thus preventing mold from seating properly, the ring 11 will force the mold to seat squarely in the chuck, the spald being bedded in the material of which the resilient insert is composed. Not being engaged by rigid metallic surfaces, the mold is not subject to abrasion.

As the mold and die are separated, seating pressure is maintained on the mold by the springs 10, thereby preventing radial displacement of the mold and possible side-swiping of the freshly formed ware by the die.

In Figure 8, a resilient insert 17 is fitted into the chuck shell 18 with shims 19 located between the circumferential wall of the chuck and insert. The shell is bored oversize and by means of the shims the cavity in the insert is reduced to the size most suited to the mold. Shims may be added as needed to compensate for wearing away of the walls of the cavity in the insert. One or more shims 20 inserted underneath the base of the insert prevent looseness in a vertical direction. By means of shims, axial alignment of the mold relative to the die and leveling thereof are obtained.

In Figure 3, 21 are diametrically opposed cylinders mounted on die base 22. The piston rods 23 support the stabilizing head 5 which is vertically adjustable thereon by nuts 24. In its lowermost position, the centering ring 11 is at or about the level of the die tip 25 thereby insuring that the mold will be engaged and seated previous to actual telescopic relation with the die 26, and preventing a badly tilted mold from colliding with the die. The stabilizing head is elevated against the back pressure of fluid being displaced in cylinders 21. When the mold recedes from the die, pressure is applied through line 27 to move the stabilizing head downwardly with the mold whilst holding the mold firmly in its seat. 28 is a vent.

In Figure 4, an annular cylinder 29 concentric with the die 30 is suspended from the die base 31. The annular piston 32 has an external sleeve 33 internally threaded at 34 into which the stabilizing head 35 is adjustably screwed. The operation of this device is as explained in connection with Figure 3.

36, Figure 5, are diametrically opposed studs slidable vertically in stationary bushings 37 in the die base 38. Suspended therefrom is the stabilizing head which comprises an upper ring 39 and a lower ring 40 held together by screws 41 and separated by spacer 42. A ring of resilient material 43 such as rubber or the like is riveted to the underside of the lower ring. Springs 44 provide back pressure on the stabilizer and nuts 45 on bushings 37 vary the tension thereof.

Ring 43 is shaped in cross section to fit the horizontal top of the mold and the downwardly sloping brim portion. Ring 40 supports all but the inner circle of the ring against vertical displacement. When the mold rises the overhanging portion on 48 of the resilient ring is deflected upwardly thereby causing the portion 49 to engage the downwardly sloping brim and circumferentially clamp the mold. The stabilizing head is raised against the tension of springs 44.

In Figure 11, 50 are diametrically opposed vertically adjustable suspension rods bolted to the die base 51 or the lintel of the machine and being located on either side of the die 52. 53 are compression members composed of live rubber or like material assembled on the lower end of rods 50 and held in clamped relation between backing members 54 and 55 by nuts 56, see Figure 12. Said members are shaped in cross section on the inner ends as the ring 43, Figure 5, the tip 57 of the member being substantially unsupported. When the mold telescopes with the die, said members 53 engage and press the mold home in the chuck, holding it in aligned working position relative to die 52, the tip end of said members being deflected upwardly or compressed upon final elevation of the mold. When the mold and die are separated, the compression members relax and for a short distance of travel of the mold away from the die maintain seating pressure thereon. Members 53 are vertically adjustable on rods 50.

It will be noted that the construction of Figure 1 as illustrated operates in substantially the same fashion as just described. That is to say, the bolts 8 are tightened so that the plate 5 would not be displaced vertically with the mold and die in substantially final closed position. The resilient ring 11 in such event is depended upon to force the mold home in its seat and prevent decentering and as the ring 11 decompresses when the mold is separated from the die, the ring will for a short interval maintain seating pressure on the mold.

In Figure 13, the rigid backing member 58 is extended to entirely support the live rubber compression member 58a against vertical displacement. If desired, the end of the member may be squared off as at 59 (dotted line).

Figure 14 illustrates the use of the device of Figure 12 with a flat ware mold. The die 60 has a husbanding groove 61 to prevent clay extruding onto the brim portion of the mold engaged by the member 62. If the mold charge is not deposited in proper position on the mold, see Figure 6, the preponderance of force applied on one side the center line may tend to tilt or tip the mold in the absence of steadying devices which are mounted on each side the mold as shown in Figure 11. It will be understood that the number of steadying devices used may exceed two.

In Figure 15, the die 63 has two or more spring chambers 64 in the outside wall 65 in which a spring 66 is located, there being a plunger 67 in the chamber to which is secured a compression member 68 composed of live rubber or the like. The long stroke on the plunger insures that the mold may be held steady in its seat whilst the mold and die approach and separate and during the dwell.

In Figure 16, one or more blocks of live rubber or like material 69 are socketed in the base of the outside wall 70 of the die 71 beyond the husbanding groove 72. Said blocks of material seat the mold whilst in the pressing position and are pressed during the operation.

Figure 17 is illustrative of a chuck and means for elevating and moving it in order that the mold may be moved into cooperation with the die. As shown, 74 is a pedestal having a guide rod 75 on which the hollow chuck sleeve 76 is mounted. 77 is a cam and 78 a lever operated by the cam to raise and lower the fork 79 which is fitted in a groove in sleeve 76.

By means of the improvements herein, it is possible to prevent mold decentering whilst the spreading action takes place. By eliminating this drawback, uniform wall thickness in successive pieces of ware may be obtained. This is a decided advantage in the manufacture of any class of ceramic ware. Furthermore, the improvements may be used with ordinary chucking facilities and are not necessarily limited to the specially designed chuck illustrated which is adapted to help center the mold automatically once pressure is applied to the mold.

Moreover, the use of non-abrasive material in the parts of the chuck and steadying means engaging the mold, there is less likelihood of damaging the mold.

Having thus described my invention, what I claim is:

1. A method for the forming of pottery ware jiggering bats on molds which comprises, removably supporting the mold in a press chuck, with clay on the molding surface of the mold, cooperating the mold and a non-adhesive die and by means of a member having relative movement with respect to the die applying pressure to the mold capable of maintaining the mold in properly centered position relative to the die before, during and after completion of the work.

2. A method for the forming of pottery ware jiggering bats on molds which comprises, removably supporting the mold in a press chuck, with clay on the molding surface of the mold, cooperating the mold and a non-adhesive die and by means of a member having relative movement with respect to the die applying pressure to the mold capable of maintaining the mold in properly centered position relative to the die before and during completion of the work.

3. A method for the forming of pottery ware jiggering bats on molds which comprises, removably supporting the mold in a press chuck, with clay on the molding surface of the mold, cooperating the mold and a non-adhesive die and by means of a member having relative movement with respect to the die applying pressure to the mold capable of maintaining the mold in properly centered position relative to the die during and after completion of the work.

4. A method for the forming of pottery ware jiggering bats on molds which comprises, removably supporting the mold in a press chuck, with clay on the molding surface of the mold, cooperating the mold and a non-adhesive die and by means of a member having relative movement with respect to the die applying pressure to the mold capable of maintaining the mold in properly centered position relative to the die during the completion of the work.

5. A method for the forming of pottery ware jiggering bats on molds which comprises, removably supporting the mold in a press chuck, with clay on the molding surface of the mold, cooperating the mold and a non-adhesive die and by means of a member having relative movement with respect to the die applying pressure to the mold capable of maintaining the mold in properly centered position relative to the forming die during association and disassociation thereof.

6. In apparatus for spreading plastic clay over the molding surface of jigger molds in preparation for jiggering, a mold chuck and an axially aligned spreading die, means for causing relative movement therebetween, a jigger mold carried by said chuck for cooperation with said die to press and spread out clay placed upon the molding surface of the mold, and means engageable with the brim zone of the mold and having relative movement with respect to the die for stabilizing the mold in the chuck during the spreading operation.

7. A method for the forming of pottery ware on molds which comprises, applying clay to the molding surface of the mold, forming the clay on the mold while the same is resiliently supported and engaging the mold with a resilient member for imposing a centralizing pressure on the mold, maintaining the application of said pressure on the mold subsequent to completion of the clay forming operation and the discontinuance of forming pressure on the mold in order that the mold may be maintained in properly aligned position as it is removed from the working position.

8. In the manufacture of pottery ware a method which consists in engaging a body of clay supported on the molding surface of a mold with a forming tool and incident to such engagement engaging the mold with a resilient member for maintaining the mold in properly aligned working position in a chuck whilst the forming member is forming the clay carried by the mold.

9. In combination with a forming tool and a mold support, means for stabilizing pottery molds in said support whilst charges of clay are being formed thereon by the tool said means including a member engageable with the upper portion of the mold composed of material yieldable in response to pressure thereon for holding the mold firmly in the support.

10. In combination with a forming tool and a mold support, means for stabilizing pottery molds in said support whilst plastic ceramic material is being formed on the molding surface thereof which comprises, a solid resilient member by means of which a seating pressure is exerted on said mold when engaged by said mold for holding the mold firmly in said support and means for supporting said member in position to engage said mold.

11. In a pottery forming machine, a pair of relatively movable forming members one comprising a mold, a support for said mold said mold being removably disposed therein, means for applying pressure to said mold to steady it in said support when said members are cooperated and means for adjusting said steadying means to vary the pressure imposed on said mold.

12. In a pottery forming machine, a die, a mold, said die and mold being relatively movable, a support for said mold, said mold being removably disposed therein, means for applying pressure to said mold to steady it in said support when said mold and die co-operate and means for adjusting the location of said means relative to said die and/or mold.

13. In combination, a forming tool, a pottery mold and a support therefor and means for steadying pottery molds in said support whilst plastic ceramic material is being formed thereon by said tool which comprises a member composed of resilient material engageable with the mold and displaceable means for supporting said member in position to engage said mold having means for resisting displacement.

14. In combination, a forming tool, a pottery mold and a support therefor and means for steadying pottery molds in said support whilst plastic ceramic material is being formed on the molding surface thereof which comprises, one or more solid resilient members engageable with the mold and by means of which a seating force is applied to the mold, a rigid backing member embracing one side surface of the resilient member and means for supporting the whole relative to the mold.

15. Means for stabilizing pottery molds in a support therefor whilst plastic ceramic material is being formed on the molding surface thereof which comprises, a solid resilient member clamped between rigid backing members, a portion of said resilient member extending beyond the support of said backing member and into position where it may normally be engaged by a mold at least when in the working position, said resilient member being capable of exerting a seating pressure on said mold when engaged thereby to hold said mold in properly aligned working position.

16. In combination, a mold chuck, a die superimposed relative thereto, a mold movably disposed in said chuck and means engageable with said mold when in cooperation with said die including a resilient member supported adjacent the die and in position to engage said mold, said resilient member being yieldable in response to pressure applied thereto by said mold and fitting the surface of the mold with which it is in engagement.

17. In apparatus for forming jiggering bats, a non-adhesive die, a mold chuck, an absorbent jiggering mold removably disposed in said chuck said mold chuck and said die being relatively movable to cooperate the mold and die and thereby spread plastic clay over the molding surface of the mold and adhesively bond the clay thereto preparatory to jiggering stripping means adjacent the die for engagement with the brim zone of the mold and means for causing relative movement between the stripping means and the die to effect seating of the mold in the chuck upon separatory movement of the die and chuck.

18. In apparatus for forming jiggering bats, a non-adhesive die, a mold chuck, an absorbent jiggering mold removably disposed in said chuck said mold chuck and said die being relatively movable in order to cooperate the mold and die to thereby spread plastic clay over the molding surface of the mold and adhesively bond the clay thereto preparatory to jiggering and a stripper engageable with the brim of the mold and means for causing relative movement between the die and stripper to strip the mold off the die and thereby maintain associated relation between the chuck and mold.

19. In apparatus for forming jiggering bats, a non-adhesive die, a mold chuck, an absorbent jiggering mold removably disposed in said chuck said mold chuck and said die being relatively movable in order to cooperate the mold and die and thereby spread plastic clay over the molding surface of the mold and adhesively bond the clay thereto preparatory to jiggering and means engageable with the brim of the mold for compelling the mold to remain seated in the chuck upon separatory movement of the die and mold comprising a body of shock-absorbent material supported above the mold.

20. In apparatus for forming jiggering bats, a non-adhesive die, a mold chuck and absorbent jiggering mold removably disposed in said chuck said mold chuck and said die being relatively removable in order to cooperate the mold and die to thereby spread plastic clay over the molding surface of the mold and adhesively bond the clay thereto preparatory to jiggering and means for stripping the mold from the die to compel the mold to remain seated in the chuck upon separatory movement of the die and mold comprising a body of shock absorbent material supported above the mold and a rigid member for supporting said material.

21. In apparatus for forming jiggering bats, a non-adhesive die, a mold chuck and absorbent jiggering mold removably disposed in said chuck said mold chuck and said die being relatively movable to cooperate the mold and die and thereby spread plastic clay over the molding surface of the mold and adhesively bond the clay thereto preparatory to jiggering and means for engagement with the mold to strip the mold from the die and compel the mold to remain seated in the chuck upon separatory movement of the die and chuck comprising a body of shock-absorbent material movably supported above the mold and rigid means for supporting said material.

22. In combination a mold chuck having a seating surface for a mold composed of shock-absorbent material, a non-adhesive die, an absorbent jiggering mold removably disposed in said chuck said mold chuck and said die being relatively movable to cooperate the mold and die to thereby spread plastic clay over the molding surface of the mold and adhesively bond the clay thereto preparatory to jiggering and means for stripping the mold from the die and compelling it to remain seated in the chuck upon separatory movement of the die and chuck comprising a body of shock absorbent material supported above the mold and rigid means for supporting said body of shock-absorbent material.

23. In combination a mold chuck having a seating surface for a mold composed of shock-absorbent material, a non-adhesive die, an absorbent jiggering mold removably disposed in said chuck said mold chuck and said die being relatively movable to cooperate the mold and die to thereby spread plastic clay over the molding surface of the mold and adhesively bond the clay thereto preparatory to jiggering, means for effecting relative movement between the stripping means and the die.

24. In the production of jiggering bats wherein adhesive clay is pressed by means of a die against a molding surface of a jigger mold and spread thereover in preparation for jiggering, the mold being removably supported in a press chuck, said press chuck and said die being relatively movable, the method of producing reliable disassociation of the die and mold upon completion of the spreading operation which comprises, rendering the die non-adhesive to clay and stripping the mold from the die by relative movement between the die and a stripping member operating upon the brim zone of the mold.

25. In combination, a die, a press chuck, a jigger mold removably disposed therein there being relative movement between said die and chuck in order to press and spread plastic clay over the molding surface of the mold in preparation for jiggering and means for producing separation of the die and mold upon completion of the spreading operation including a stripper positioned adjacent the die, and means for effecting relative movement between said die and said stripper.

26. In apparatus for spreading plastic jiggering clay over the molding surface of jigger molds in preparation for jiggering, the combination which comprises, a mold chuck and a die, there being relative movement therebetween, a jigger mold removably disposed in said chuck for cooperation with said die, means for rendering said die non-adhesive to clay and stripping means positioned adjacent the die for producing disassociation of the die and mold upon separating movement of the chuck and die, said die and said stripping means being relatively movable.

27. In apparatus for spreading plastic jiggering clay over the molding surface of jigger molds in preparation for jiggering, a mold chuck and an axially aligned spreading die, means for causing relative axial movement therebetween, a jigger mold carried by the chuck for cooperation with said die, means for minimizing the adhesiveness of the clay to the die, a stripper positioned adjacent the die and so located as to engage the face of the jigger mold outside the margin of the spread clay, the stripper being substantially in engagement with the mold when the axial relative movement of the chuck and the die toward and away from one another has been completed and means for thereafter causing relative axial movement of the die and the stripper away from one another.

WILLIAM J. MILLER.